US007353503B2

(12) United States Patent
Nair et al.

(10) Patent No.: US 7,353,503 B2
(45) Date of Patent: Apr. 1, 2008

(54) EFFICIENT DEAD CODE ELIMINATION

(75) Inventors: Sreekumar R. Nair, Sunnyvale, CA (US); Sheldon M. Lobo, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 625 days.

(21) Appl. No.: 10/330,375

(22) Filed: Dec. 27, 2002

(65) Prior Publication Data

US 2004/0128660 A1 Jul. 1, 2004

(51) Int. Cl.
*G06F 9/45* (2006.01)

(52) U.S. Cl. ...................... 717/151; 717/154; 717/155; 717/156

(58) Field of Classification Search ........ 717/106-161; 719/331, 351; 712/10, 4, 222, 226
See application file for complete search history.

(56) References Cited

U.S. PATENT DOCUMENTS 6,047,372 A * 4/2000 Thayer et al. .............. 712/222
6,298,438 B1 * 10/2001 Thayer et al. .............. 712/226
6,493,869 B1 * 12/2002 Kwiatkowski et al. ...... 717/106
6,665,866 B1 * 12/2003 Kwiatkowski et al. ...... 717/159
6,751,792 B1 * 6/2004 Nair ........................... 717/161
6,795,908 B1 * 9/2004 Lee et al. ...................... 712/4
6,988,185 B2 * 1/2006 Stark et al. ................. 712/214
2003/0028750 A1 * 2/2003 Hogenauer ................... 712/10
2003/0074654 A1 * 4/2003 Goodwin et al. ........... 717/161
2004/0045018 A1 * 3/2004 Nair ........................... 719/331
2004/0088691 A1 * 5/2004 Hammes et al. ............ 717/158
2004/0111713 A1 * 6/2004 Rioux ........................ 717/137

* cited by examiner

*Primary Examiner*—Meng-Al T. An
*Assistant Examiner*—Mark P. Francis
(74) *Attorney, Agent, or Firm*—Dorsey & Whitney LLP

(57) ABSTRACT

Disclosed is a method for eliminating dead code from a computer program using an operands graph generated from a flow graph of a computer program. In one embodiment of the present invention, the operands graph is traversed for any unused operands. Upon detection of any,unused operands, the instructions defining the unused operands are removed from execution.

19 Claims, 8 Drawing Sheets

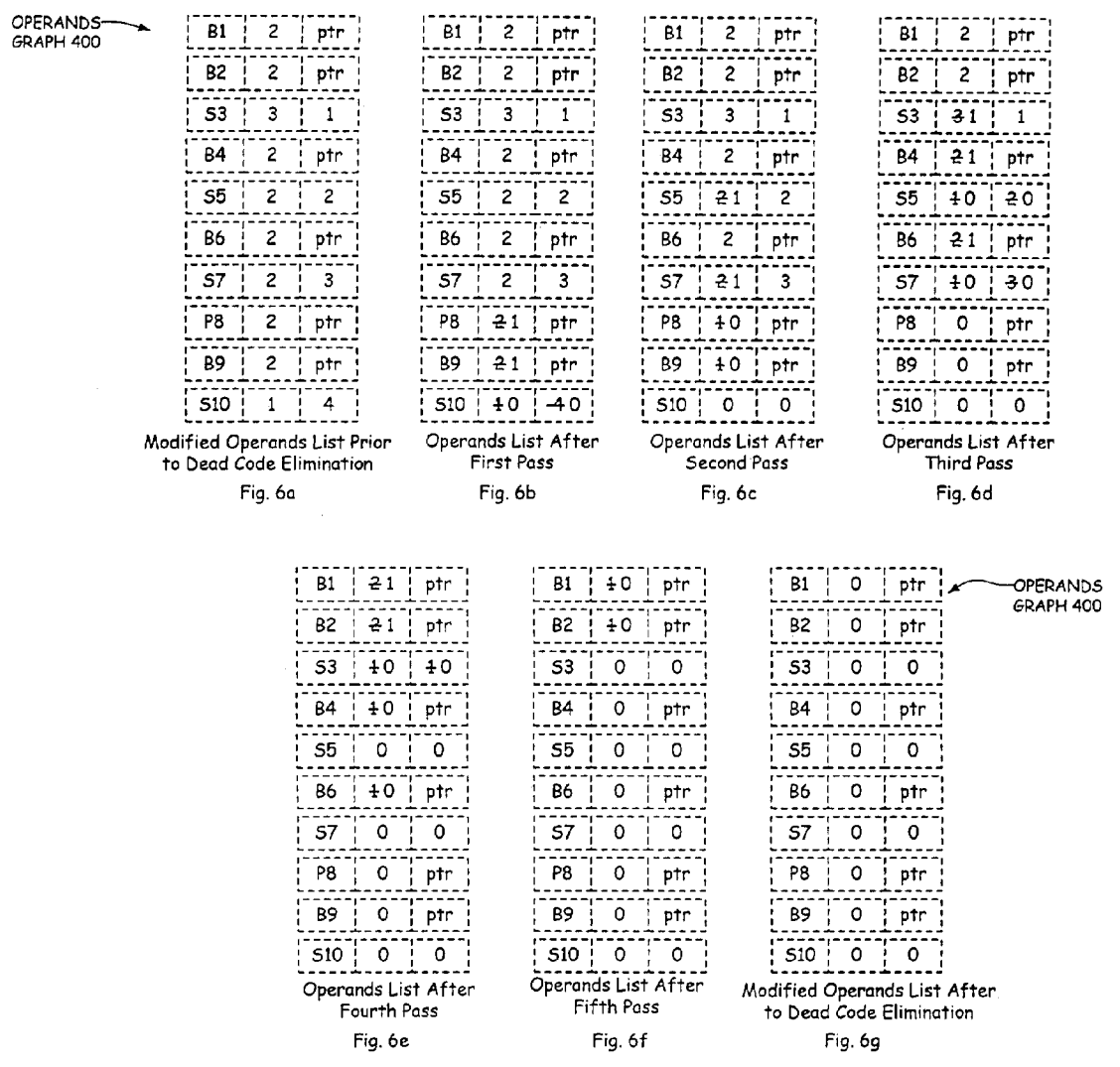

OPERANDS GRAPH 400

| | | |
|---|---|---|
| B1 | 2 | ptr |
| B2 | 2 | ptr |
| S3 | 3 | 1 |
| B4 | 2 | ptr |
| S5 | 2 | 2 |
| B6 | 2 | ptr |
| S7 | 2 | 3 |
| P8 | 2 | ptr |
| B9 | 2 | ptr |
| S10 | 1 | 4 |

Modified Operands List Prior to Dead Code Elimination

Fig. 6a

| | | |
|---|---|---|
| B1 | 2 | ptr |
| B2 | 2 | ptr |
| S3 | 3 | 1 |
| B4 | 2 | ptr |
| S5 | 2 | 2 |
| B6 | 2 | ptr |
| S7 | 2 | 3 |
| P8 | ~~2~~ 1 | ptr |
| B9 | ~~2~~ 1 | ptr |
| S10 | ~~1~~ 0 | ~~4~~ 0 |

Operands List After First Pass

Fig. 6b

| | | |
|---|---|---|
| B1 | 2 | ptr |
| B2 | 2 | ptr |
| S3 | 3 | 1 |
| B4 | 2 | ptr |
| S5 | ~~2~~ 1 | 2 |
| B6 | 2 | ptr |
| S7 | ~~2~~ 1 | 3 |
| P8 | ~~1~~ 0 | ptr |
| B9 | ~~1~~ 0 | ptr |
| S10 | 0 | 0 |

Operands List After Second Pass

Fig. 6c

| | | |
|---|---|---|
| B1 | 2 | ptr |
| B2 | 2 | ptr |
| S3 | ~~3~~ 1 | 1 |
| B4 | ~~2~~ 1 | ptr |
| S5 | ~~1~~ 0 | ~~2~~ 0 |
| B6 | ~~2~~ 1 | ptr |
| S7 | ~~1~~ 0 | ~~3~~ 0 |
| P8 | 0 | ptr |
| B9 | 0 | ptr |
| S10 | 0 | 0 |

Operands List After Third Pass

Fig. 6d

| | | |
|---|---|---|
| B1 | ~~2~~ 1 | ptr |
| B2 | ~~2~~ 1 | ptr |
| S3 | ~~1~~ 0 | ~~1~~ 0 |
| B4 | ~~1~~ 0 | ptr |
| S5 | 0 | 0 |
| B6 | ~~1~~ 0 | ptr |
| S7 | 0 | 0 |
| P8 | 0 | ptr |
| B9 | 0 | ptr |
| S10 | 0 | 0 |

Operands List After Fourth Pass

Fig. 6e

| | | |
|---|---|---|
| B1 | ~~1~~ 0 | ptr |
| B2 | ~~1~~ 0 | ptr |
| S3 | 0 | 0 |
| B4 | 0 | ptr |
| S5 | 0 | 0 |
| B6 | 0 | ptr |
| S7 | 0 | 0 |
| P8 | 0 | ptr |
| B9 | 0 | ptr |
| S10 | 0 | 0 |

Operands List After Fifth Pass

Fig. 6f

OPERANDS GRAPH 400

| | | |
|---|---|---|
| B1 | 0 | ptr |
| B2 | 0 | ptr |
| S3 | 0 | 0 |
| B4 | 0 | ptr |
| S5 | 0 | 0 |
| B6 | 0 | ptr |
| S7 | 0 | 0 |
| P8 | 0 | ptr |
| B9 | 0 | ptr |
| S10 | 0 | 0 |

Modified Operands List After to Dead Code Elimination

Fig. 6g

Flow Graph Prior to Dead Code Elimination

Flow Graph Following Dead Code Elimination

EFFICIENT DEAD CODE ELIMINATION

FIELD OF THE INVENTION

The present invention relates in general to the field of compilers and, more particularly, to eliminating dead code from a computer program.

BACKGROUND OF THE INVENTION

Eliminating unused code, or dead code, from a computer program is an optimization technique performed by optimizing compilers. Dead code is essentially code within a computer program that provides a result that is never used. Because the result goes unused, the code producing the result may be eliminated from the program without any adverse effects to the execution of the program. In fact, eliminating dead code from a program may speed up the execution of the program and/or decrease the overall size of the program executable.

One common technique of eliminating dead code from a program involves utilizing an optimizing compiler to traverse a control flow graph of the program to identify and remove dead code. A control flow graph is a representation of the instruction flow of a computer program. A control flow graph models how the flow of a program proceeds from one instruction to the next along various edges, such as branches and calls. Unfortunately, traversing a control flow graph in control flow order to identify unused code is inefficient.

Because a control flow graph is structured to model the control flow of a program, traversing a control flow graph often involves visiting identical sections of code numerous times. For a program that may include many identical calls to one large routine (e.g., a routine containing numerous instructions), this can add substantial time to the overall optimization of the program. Further, because programs themselves often contain a large number of instructions, an optimization method that relies on eliminating dead code by traversing instructions of a control flow graph in control order can be very time intensive.

SUMMARY OF THE INVENTION

Disclosed is a method for eliminating dead code from a computer program by using an operands graph generated from a flow graph of a computer program. In one embodiment of the present invention, the operands graph is traversed for any unused operands. Upon detection of any unused operands, the instructions defining the unused operands are removed from execution.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features

FIGS. 6(A-G) are block diagrams of an operands graph undergoing an exemplary process of removing dead code in accordance with the present invention;

DETAILED DESCRIPTION

Figure 1:
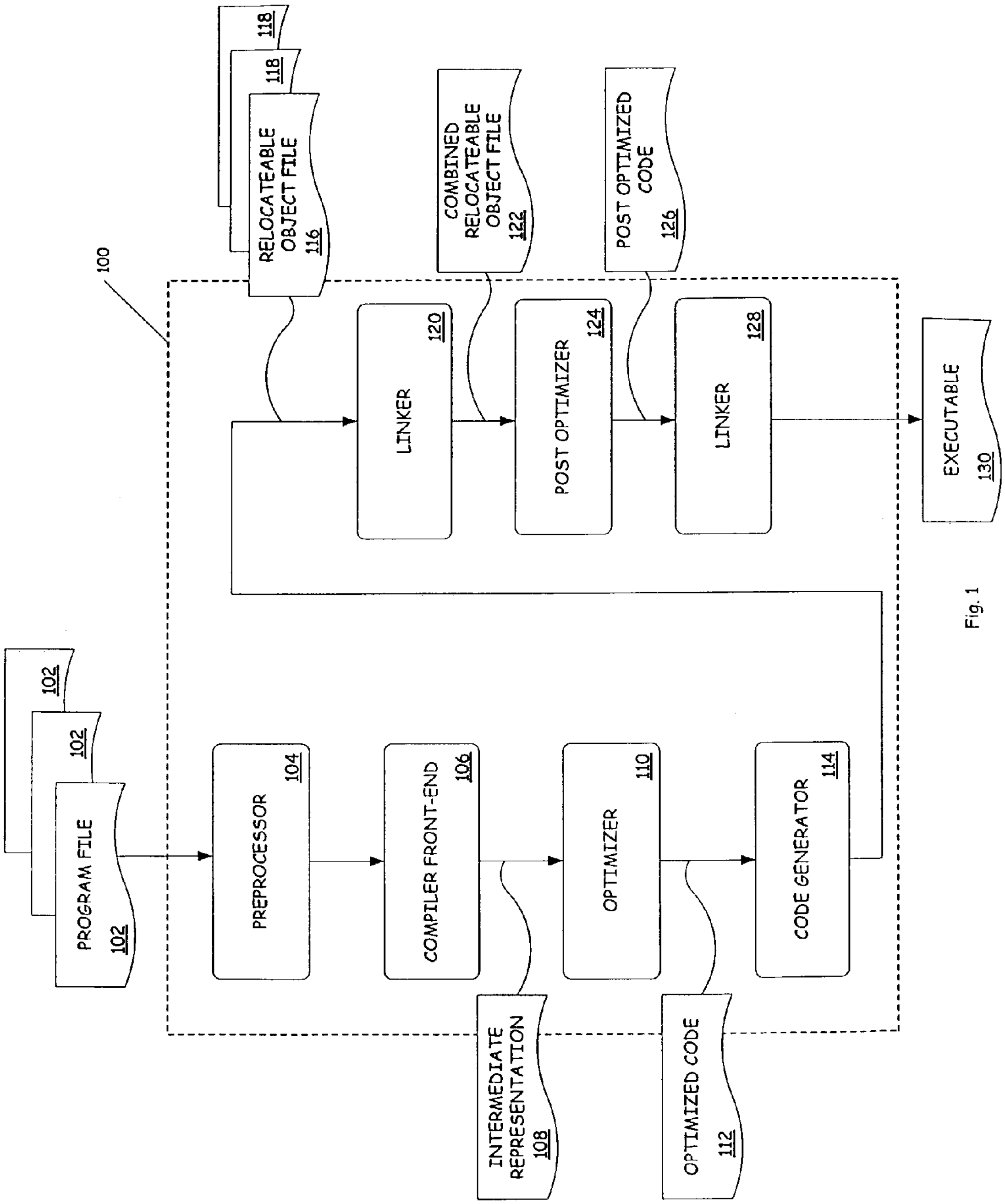
FIG. 1 is a block diagram illustrating a compiler according to an embodiment of the present invention.

The following text and Figures are intended to provide a detailed description of exemplary embodiments of the invention. However, the scope of the invention should not be limited to the examples provided herein, but rather should be defined by the claims provided at the end of the description.

Introduction

Efficient dead code elimination in accordance with the present invention can be used to identify unused instructions of a computer program and remove the instructions from execution (e.g., by deleting the instructions, modifying the control flow of the program to bypass the instructions, etc.). Such a system and method of efficient dead code elimination can improve the execution performance of a computer program and/or decrease the memory consumed thereby.

The approach of efficient dead code elimination according to the present invention uses an operands graph as a mechanism by which to identify unused code (i.e., dead instructions). An operands graph for a computer program is a linked list of all the operands defined and used within the computer program. The operands graph includes information such as the operand type, a pointer to the instruction that defined the operand, and a count of the number of times the operand is used within a computer program (an operand reference count). As used herein, an operand refers to a parameter (often represented by a register) of an assembly language instruction. Also as used herein, an operand is defined when the operand is the target (e.g., stores the result) of such an instruction. Further, as used herein, an unused (i.e., dead) operand is an operand that has been defined, but is not used, either within the computer program as a whole, or a smaller scope of the computer program. Identifying unused instructions according to the present invention involves a process of searching the operands graph for unused operands, obtaining a pointer to the instruction that defined the unused operand, marking the defining instruction as dead, and removing the instruction from execution.

One exemplary process of removing dead code using a method and apparatus of the present invention can be implemented as follows. Using the methods described in U.S. patent application Ser. No. 09/679,945 filed Oct. 4, 2000, entitled "USING VALUE-EXPRESSION GRAPHS FOR DATA-FLOW OPTIMIZATIONS", incorporated by reference herein in its entirety, a flow graph and an operands graph of a computer program are generated. Briefly, a flow graph is a representation of the computer program that includes such information as program flow, basic blocks, edges, and operands of the program. From the flow graph, an operands graph is generated.

To create the operands graph, a unique memory location (e.g., a virtual register) is created for each operand that is defined in a program (i.e., in the flow graph). This virtual register is used to store the operand type, the operand reference count and the defining instruction pointer. Upon initial detection of an operand, the initial value of the operand reference count is set to "1" to indicate the operand has been defined. Also, the defining instruction pointer is set to point to the instruction that defined this operand. The operand reference count is then incremented for each use of the operand that is encountered in the program.

An instruction (e.g., an assembly language instruction) may be eliminated from a program if the instruction defines an operand that is not used. In other words, if the operand is not used, the instruction defining the unused operand may be considered as not used and removed without any adverse effect to the program execution. Rather than traverse a computer program on an instruction-by-instruction basis looking for unused instructions, embodiments of the present invention traverse the operands graph. Because the number of operands in a computer program is often less than the number of instructions, the method of the present invention provides a faster optimization technique when compared to traditional methods of dead code elimination.

In one embodiment of the present invention, unused operands are identified in the operands graph as having an operands reference count of 1. Upon detection of an unused operand, the associated pointer to the instruction defining the unused operand is read from the operands graph and the defining instruction is marked as dead (e.g., removed from the flow graph, or the computer program). When an instruction has been marked dead, the operands reference count of each operand used by the dead instruction is decremented (this is done because the operands in the dead instruction are used at least one less time). The operands graph is then recursively checked to ensure that all instructions defining unused operands have been removed. A more detailed explanation of this process is described below (e.g., with reference to FIG. 5).

An important advantage of utilizing an operands graph for identifying and eliminating dead code is that the need to identify dead code by traversing the flow graph in a control flow manner of a program is obviated. Traversing a flow graph in a control flow manner is undesirable because of the inefficiencies associated with control flow. For example, traversing a control flow graph often involves visiting identical sections of code numerous times. For a program that may include many identical calls to one large routine (e.g., a routine containing numerous instructions) this can add substantial time in the overall optimization of the program. Further, because programs themselves often contain a large number of instructions, an optimization method that relies on eliminating dead code one instruction at a time can be very time intensive Other advantages of an efficient dead code elimination technique according to the present invention include faster program optimization, improved efficiency of program execution, and decreased program size.

Compiler Architecture

FIG. 1 illustrates a block diagram of a compiler 100 which can be used to eliminate dead code in accordance with an embodiment of the present invention.

To generate optimized executable code using compiler 100, one or more program files 102 are input into a preprocessor 104. Preprocessor 104 performs such tasks as, for example, replacing certain names in program files 102 with token strings (e.g., #define) and/or carrying out directives included in program files 102 (e.g., including one or more header files as directed by #include).

The output from preprocessor 104 is input into a compiler font-end 106. Compiler front-end 106 translates the instructions in program files 102 into assembly language instructions to produce an intermediate representation 108.

From compiler font-end 106, intermediate representation 108 is input into an optimizer 110 to produce optimized code 112, which in turn is input into a code generator 114 to produce a relocatable object file 116. In one embodiment of the present invention, code generator 114 generates code that is part of the SPARC™ V9 instruction set architecture. In another embodiment of the present invention, code generator 114 generates code that is part of an Intel based instruction set architecture.

Relocatable object file 116 is input into a linker 120 along with any additional relocatable object files 118. Linker 120 links relocatable object file 116 with additional relocatable object files 118, and any necessary library functions, to produce combined relocatable object file 122.

From linker 120, combined relocatable object file 122 is input into a post-optimizer 124 to produce post-optimized code 126. Post-optimizer 124 is a link-time optimizer that generates optimized relocatable object files from one or more input relocatable object files. Post-optimizer 124 generates post-optimized relocatable object files by disassembling the input relocatable object file, composing an internal whole program control flow graph, optimizing the control flow graph, and generating a post-optimized relocatable object file from the optimized control graph. From post-optimizer 124, post-optimized code 126 is input into linker 128 to produce optimized executable 130.

Post Optimizer Architecture

Figure 2:
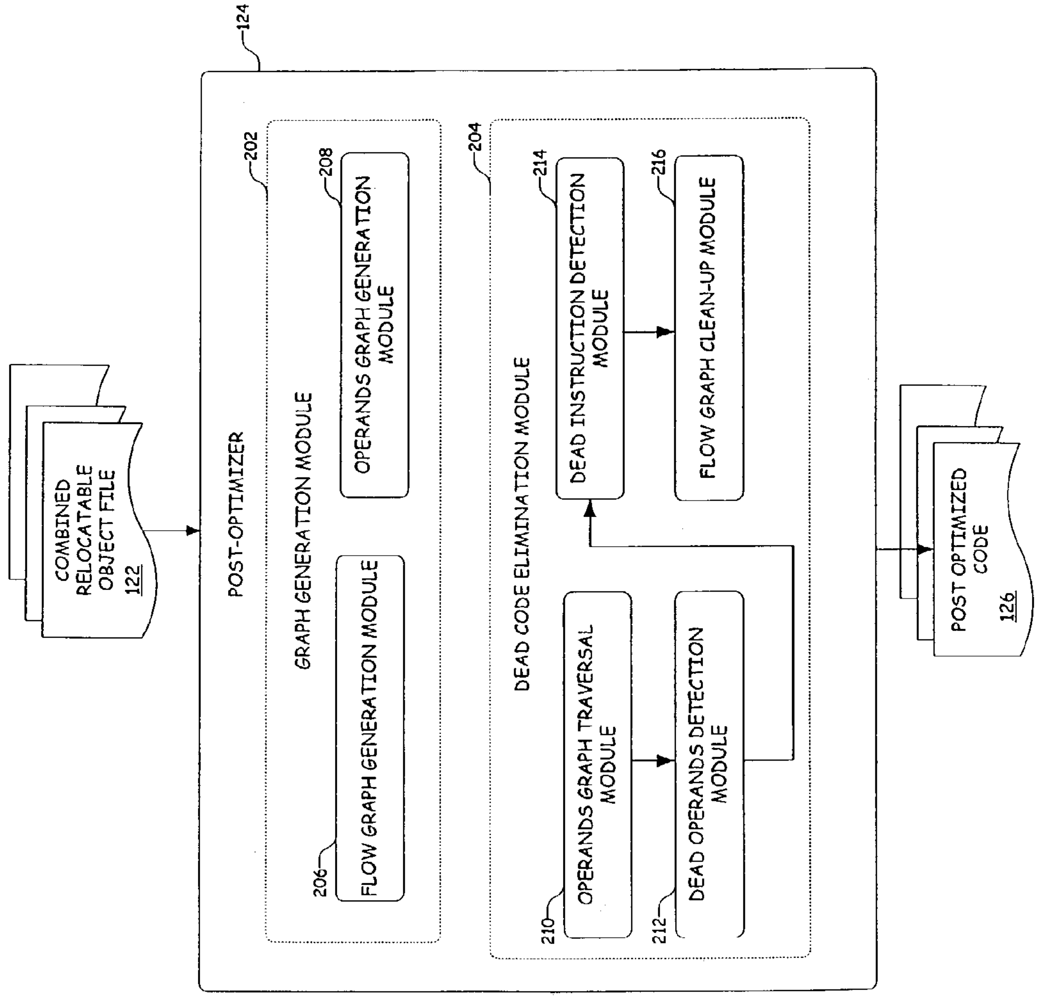
FIG. 2 is a block diagram of a post-optimizer used to remove dead code in accordance with the present invention.

FIG. 2 illustrates a block diagram of a post-optimizer 124 which can be used to efficiently remove dead code from, for example, combined relocatable object file 122 in accordance with the present invention. Post-optimizer 124 includes a graph generation module 202 and a dead code elimination module 204.

Graph generation module 202 includes a flow graph generation module 206, and an operands graph generation module 208. Using the process described in U.S. patent application Ser. No. 09/679,945 filed Oct. 4, 2000, entitled "USING VALUE-EXPRESSION GRAPHS FOR DATA-FLOW OPTIMIZATIONS", referenced in the "Introduction" section, flow graph generation module 206 operates to construct a flow graph (e.g., flow graph 310 of FIG. 3) from, for example, combined relocatable object file 122. From the flow graph, operands graph generation module 208 operates to construct an operands graph (e.g., operands graph 400 of FIG. 4).

In accordance with the present invention, dead code elimination module 204 operates on the operands graph to identify and remove dead code. Dead code elimination module 204 includes an operands graph traversal module 210, a dead operands detection module 212, a dead instruction detection module 214, and a flow graph clean up module 216. As described in greater detail with reference to FIG. 5 below, dead code elimination module 204 traverses an operands graph in search of dead operands, removes instructions defining any dead operands, and adjusts the flow graph accordingly, so the dead instructions are removed from execution. It will be recognized that dead code elimination module 204 may reside in other components of a compiler as well, or be a separate module of compiler 100.

Exemplary Graphs

As an aid to describing and understanding the present invention, FIGS. 3 and 4 illustrate an exemplary flow graph and operands graph for a computer program, respectively.

Exemplary Flow Graph

Figure 3A:
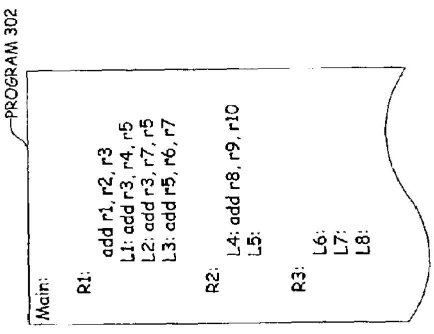
FIG. 3 illustrates exemplary representations of a flow graph for a computer program.

An exemplary flow graph 300 for a computer program 302 is illustrated in FIG. 3. In FIG. 3*a*, program 302 includes a Main routine along with routines R1, R2 and R3. Routine R1 includes instructions along with basic blocks L1, L2, and L3 (it is noted that a routine may also be considered a basic block). Routines R2 and R3 also include instructions and basic blocks (not illustrated in detail).

Figure 3B:
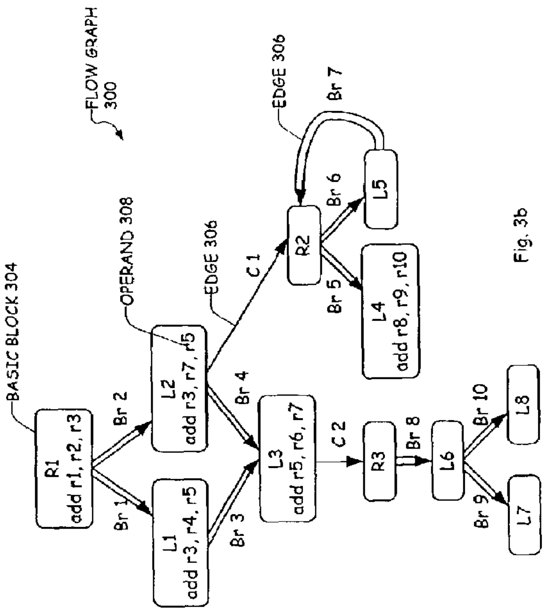
Figure 3C:
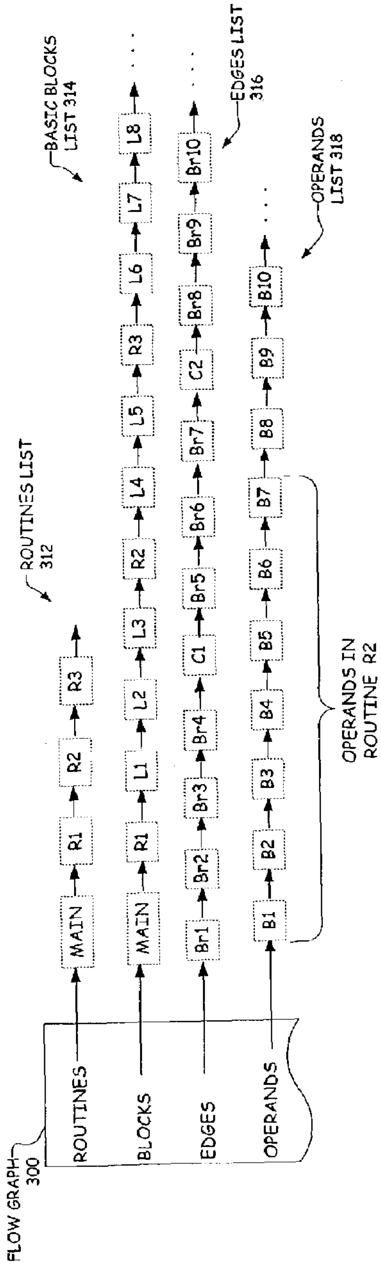

Using the process described in U.S. patent application Ser. No. 09/679,945 filed Oct. 4, 2000, entitled "USING VALUE-EXPRESSION GRAPHS FOR DATA-FLOW OPTIMIZATIONS", flow graph generation module 206 generates a flow graph 300 from program 302 (or a representation thereof, e.g., an object file). FIG. 3 provides two representations of flow graph 300, a graphical representation presented in FIG. 3*b,* and a linked list representation in FIG. 3*c*.

With respect to FIG. 3*b*, flow graph 300 includes basic blocks 304, edges 306 connecting basic blocks 304, and operands 308 within basic blocks 304. Flow graph 300 in FIG. 3*b* illustrates a graphical representation of the control flow of program 302. For example, from routine R1, control may pass to basic blocks L1 or L2 via branch 1 (Br 1) or branch 2 (Br 2), respectively. From basic block L2, control may pass to routine R2 via call 1 (c1) or basic block L3 via branch 4 (Br 4), etc.

With respect to FIG. 3*c,* a linked list representation of flow graph 300 is presented. Flow graph 300 includes a linked list of routines 312, a linked list of basic blocks 314, a linked list of edges 316, and a linked list of operands 318. Linked list of routines 312 includes the routines Main, R1, R2, R3, and any other routines of program 302. Linked list of basic blocks 314 includes basic blocks Main, R1, L1, etc. (it is noted that a routine is also considered a basic block), and any other basic blocks of program 302. Linked list of edges 316 includes branches Br1, Br2, etc., and calls C1, C2, etc. Linked list of operands 318 includes base operands B1, B2, etc. Each operand within linked list of operands 318 represents an operand within program 302. For example, referring to the operands of routine R1, operand r1 within program 302 is represented by base operand B1 within linked list of operands 318, operand r2 is represented by base operand B2, etc.

Exemplary Operands Graph

From flow graph 300, operands graph generation module 208 generates an operands graph (e.g., operands graph 400 of FIG. 4). This process is described in detail in U.S. patent application Ser. No. 09/679,945 filed Oct. 4, 2000, entitled "USING VALUE-EXPRESSION GRAPHS FOR DATA-FLOW OPTIMIZATIONS". It is recognized, however, that any Static Single Assignment (SSA) algorithm may be used to generate operands graph 400.

Figure 4A:
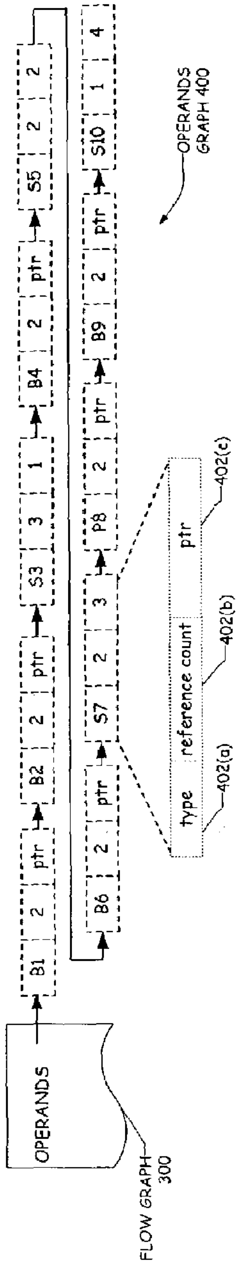
FIG. 4 illustrates an exemplary operands graph in accordance with the present invention.

FIG. 4*a* illustrates an exemplary operands graph 400. Operands graph includes a linked list of operands 402, with each operand 402 including an operand type 402(*a*), and operand reference count 402(*b*) and a pointer to the instruction which defined the operand 402(*c*).

Figure 4B:
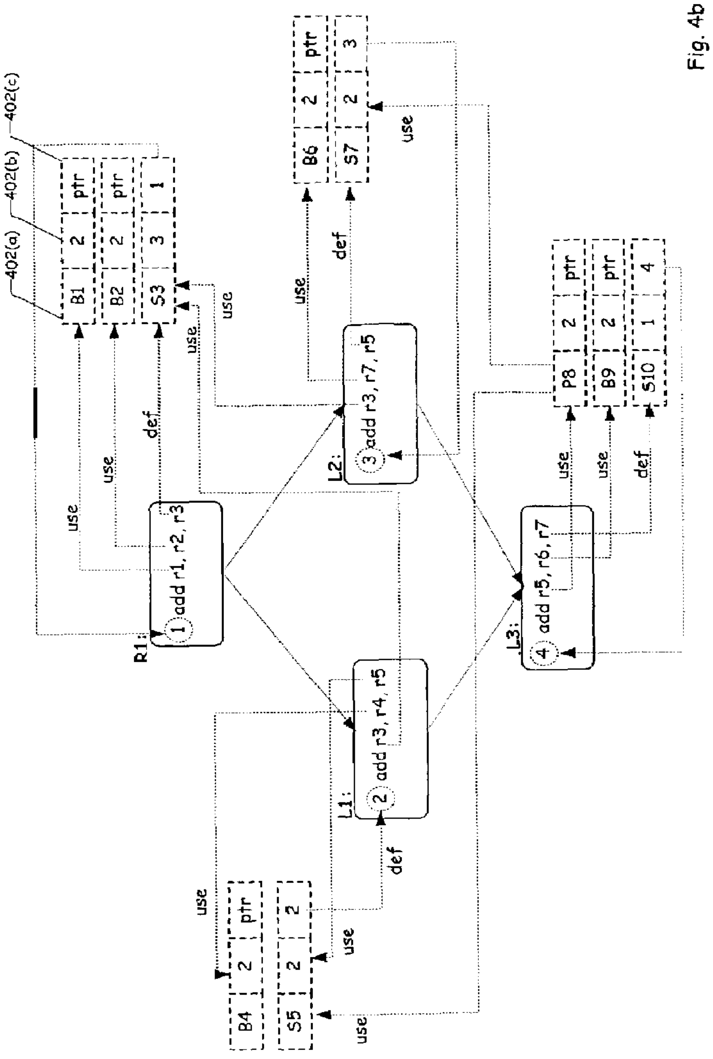

FIG. 4*b* illustrates how operands graph 400 represents operand information for operands in routine R1 of program 302. For example, operand type B1 represents operand r1 of instruction (1). The reference count of operand type B1 is 2 and the pointer to the defining instruction is "ptr". The reference count is 2 because the instruction has been defined once and is used once by instruction (1). The pointer to the defining instruction for operand type B1 is "ptr" to reflect that r1 is defined outside the scope of routine R1. It will be recognized that the present invention can be used to generate an operands graph for any scope of program 302.

Similarly, operand type S3 represents operand r3 of instruction (1). The reference count of operand S3 is 3 and the pointer to the defining instruction is (1). The reference count is 3 because the instruction is defined once (by instruction (1)) and used twice (by instructions (2) and (3), respectively). The pointer to the defining instruction is (1) to reflect that instruction (1) defines operand type S3. A similar representation is provided for the remaining operands.

U.S. patent application Ser. No. 09/679,945 filed Oct. 4, 2000, entitled "USING VALUE-EXPRESSION GRAPHS FOR DATA-FLOW OPTIMIZATIONS" should be consulted for a more detailed discussion of flow graph 300 and operands graph 400 are generated. For the purposes of the present invention, it is assumed that flow graph 300 and operands graph 400 have already been generated.

Exemplary Technique to Remove Dead Code

Figure 5:
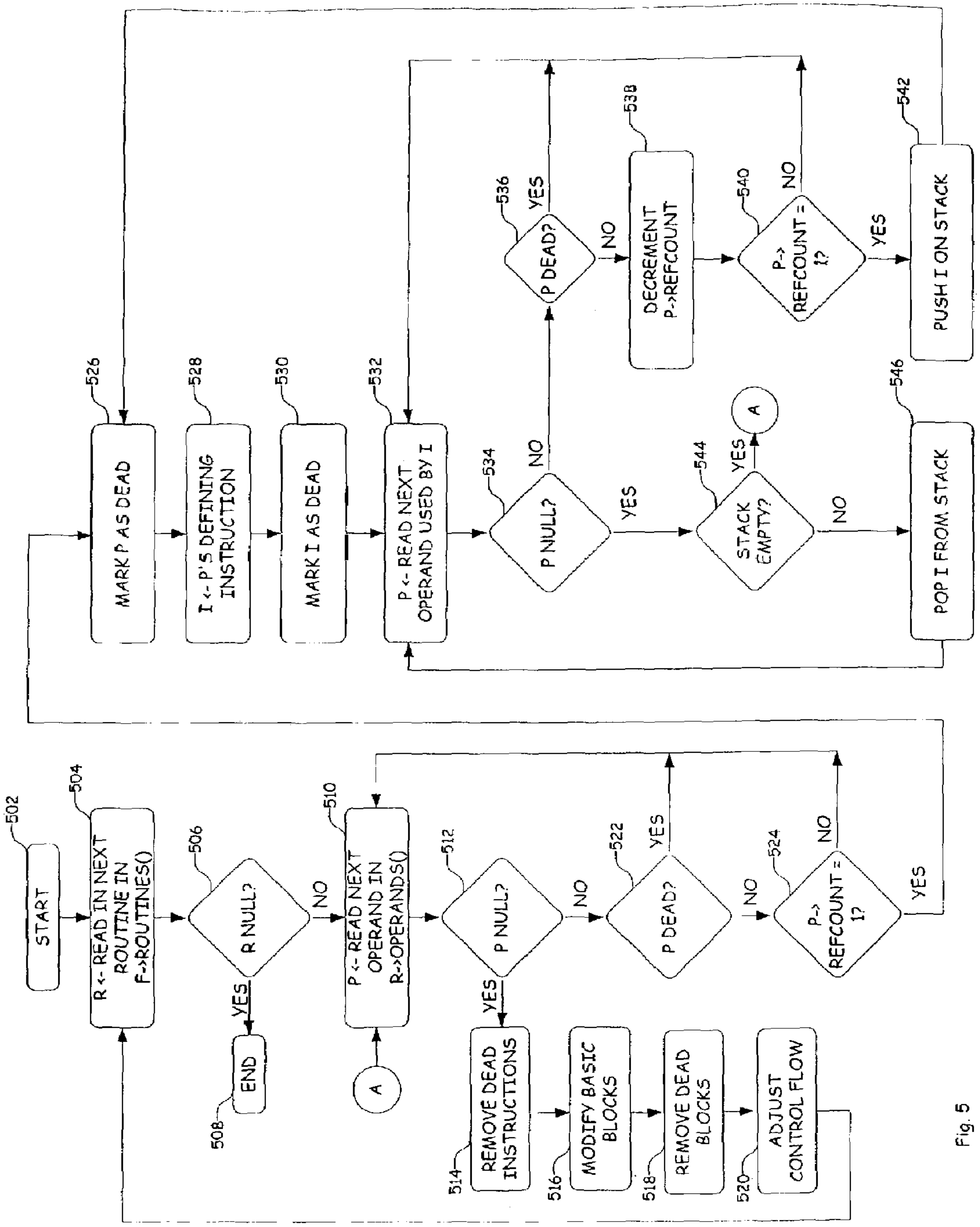
FIG. 5 is a flow chart illustrating a process of eliminating dead code in accordance with the present invention.

FIG. 5 illustrates a flow chart 500 of a process performed by dead code elimination module 204 to eliminate dead code in accordance with the present invention. A general overview of the process described in FIG. 5 proceeds as follows: Beginning with an operands graph, the operand reference count for each operand in the operands graph is evaluated to determine whether the operand is used (The operand is used if the reference count is greater than 1). If the operand is not used (i.e., has an operand reference count of "1") the operand is marked as dead along with the instruction which defined the operand. Before proceeding to the next operand, in recursive fashion the operand reference count of each operand used by the dead instruction is decremented, and that operand reference count is evaluated to determine whether that operand may now be marked as dead, in which case that dead instruction would be marked dead, and so on. The process continues recursively until each operand within the operands graph is evaluated. A more detailed description of the process will now be provided.

Initially a routine within the operands graph is read and a pointer to the routine is stored in R (step 504). If R is null, reflecting that no more routines exist, the process is complete ("YES" branch of decision block 506 and step 508). Otherwise, a virtual register of the operands list for the routine is read and a pointer to the virtual register is stored in P ("NO" branch of decision block 506 and step 510). If P is null, then each of the operands within the current routine have been evaluated ("YES" branch of decision block 512). If each operand in the routine has been evaluated, the current routine is "cleaned-up". The clean-up involves removing each of the dead instructions in the routine (step 514), adjusting the linked lists in the basic block to compensate for the removed instructions (step 516), removing any basic blocks for which all of the instructions have been removed (step 518), and adjusting the operands graph to compensate for any basic blocks removed (520).

If, however, P is not null, then there remain operands to be evaluated ("NO" branch of decision block 512). In evaluating an operand, initially the operand is checked to see if the operand has been marked dead. If the operand has been marked dead, then all of the evaluation necessary for the operand has been performed and the process returns to evaluate the next operand in the routine ("YES" branch of decision block 522). If, however, the operand has not been marked dead, the operand reference count is checked to determine if the operand should be marked dead ("NO" branch of decision block 522). If the operand reference count of the operand is not equal to "1" (e.g., is greater than "1"), the operand does not need to be marked dead (because the operand is used at least once) and the process returns to evaluate the next operand in the list ("NO" branch of decision block 524).

If, however, the operand reference count for the current operand is equal to "1" (e.g., the operand is only defined, and not used), then the operand is not used, and the operand is marked dead ("YES" branch of decision block 524 and step 526). It will be recognized that values other than "1" may be used as a basis for determining the use count of an operand in the operand reference count. For example, if the operand reference count is set to 0 for the definition of the operand, than a value of 0 will indicate the operand is not used while a value of 3 will indicate the operand is used three times. Similarly, if the operand reference count is set to 2 when the operand is first defined, then a value of 2 will indicate the operand is not used while a value of 5 will indicate the operand is used three times. In other words, any counting scheme may be used to keep track of the number of times an operand is defined and used within a program.

Returning to step 526 of the flow chart where an instruction is marked dead, in the presently described embodiment an instruction is marked dead by storing a zero in the operand reference count of the operands graph. In another embodiment of the present invention, an operand is marked dead by tagging the virtual register associated with the operand with a specific value (e.g., "true"). It will be recognized that other identification methods may be used to mark an operand as dead.

After the operand has been marked dead, the pointer to the instruction that defined the operand is obtained from the pointer field of the virtual register of the operand (step 528), and the defining instruction is marked dead (step 530) (using a similar technique to marking the operand dead).

Once an instruction has been marked dead, it is necessary to adjust the operand reference count of the operands that are used by the now dead instruction, because those operands are no longer used by the now dead instruction. Accordingly, in the present embodiment, one by one, a pointer to the operand reference count of each of the operands used in the dead instruction is read in to P (step 532). If P is null, then all of the operands have been evaluated ("YES" branch of decision block 534). If, however, there are more operands associated with the now dead instruction to be evaluated ("NO" branch of decision block 534), and the operand is not already dead ("NO" branch of decision block 536), the operand reference count for the operand is decremented, preferably by 1 (step 538). If the operand was already dead, then the next operand of the dead instruction is evaluated ("YES" branch of decision block 536).

Once the operand reference count of an operand used by a dead instruction has been decremented, it is necessary to then determine whether that operand should be marked dead, and consequently any instruction defining that operand marked dead. Accordingly, after the operand reference count has been decremented in step 540, the operand reference count is evaluated, and if the operand reference count is equal to 1 ("YES" branch of decision block 540) that operand is marked dead (step 526), and the recursive process continues until each instruction of the operand has been evaluated. Before marking the instruction dead following a decision in decision block 540, however, the current instruction (i.e., the instruction which had just been marked dead) is pushed on a stack (step 542) so that the remaining operands associated with that instruction can be evaluated once the instructions associated with the operands which were used by the now dead instruction have been evaluated. Accordingly, there are no more operands for a given instruction to evaluate, a stack is checked, and if the stack is not empty ("NO" branch of decision block 544, an instruction is popped from the stack (the instruction was pushed on the stack a step 542) (step 546), and the operands associated with the popped instruction are evaluated. Once the recursive process has completed and the stack of instructions is empty ("YES" branch of decision block 544), the process returns to step 510 to read the next operand in the operand list, and the process repeats until each of the operands in the operand list have been evaluated.

An Example of Removing Dead Code

FIG. 6 illustrates how the technique of FIG. 5 may be used on operands graph 400 to remove dead code. In the presently described example, it is desired to remove dead code from routine R1. It will be recognized, however, that the technique described herein may be extended to any scope of program 302.

FIG. 6*a* illustrates operands graph 400 for operands of routine R1. It is recognized that operands graph 400 may also include operands of scopes other than routine R1, including all operands of program 302

Initially, in FIG. 6*a,* operands graph 400 is traversed for dead operands (i.e., operands having a reference count of 1). If any are located, the defining instruction may be marked dead and removed from execution. Within FIG. 6*a,* it can be seen that the reference count for operand S10 is 1, indicating that this operand is defined but not used. Accordingly, the defining instruction for operand S10, instruction 4, may be marked dead and removed from execution. The operands graph resulting from this process is illustrated in FIG. 6*b*. In the present embodiment, an instruction is marked dead by including a 0 within the instruction pointer field. However, it is recognized that any similar method of identifying the defining instruction may be used to mark an instruction as dead.

In FIG. 6*b,* it is seen that the reference count of operand S10 has been decreased to 0, marking it as dead. Accordingly, instruction 4 (the defining instruction for operand S10) has also been marked as dead (illustrated by the 0 within the pointer field of operand S10). Upon marking instruction 4 as dead, the reference count for the operands that were used by instruction 4 must be decremented to reflect that the operands are used at least one less time. This is illustrated by decrementing the reference count for operands P8 and B9 from 2 to 1.

This process of identifying unused operands, marking their defining instructions as dead, and adjusting the reference count of operands used by the dead instruction is recursively repeated until no more unused operands are detected. This is illustrated in FIGS. 6*c*-6*f.* FIG. 6*g* illustrates operands graph 400 upon completion of the process. From FIG. 6*g,* it can be seen that all operands have been marked as dead, along with the corresponding defining instructions within routine R1. The use of "ptr" within a defining instruction field indicates that the operand was defined outside the scope of R1, and is not marked dead (this is so because the scope of the present example is presented only with respect to removing instructions from routine R1).

However, although in the present example, instructions outside the scope of routine R1 are not marked dead, other embodiments of the present invention may mark such instructions as dead. Further, it is recognized that the present invention may be used to remove dead code from any scope of program 302.

Figure 7A:
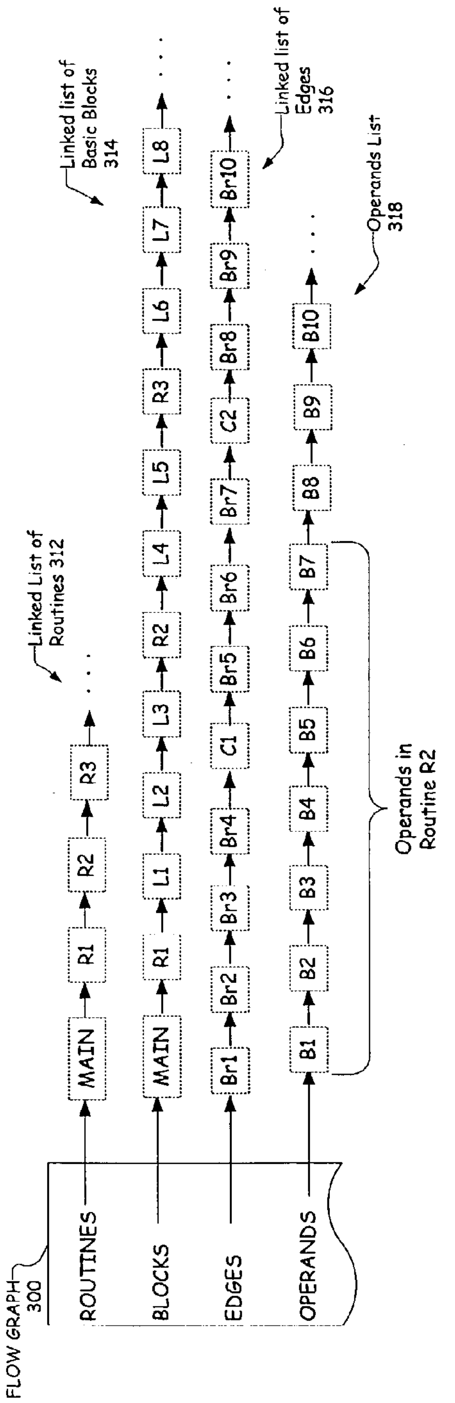
FIG. 7 is a block diagram of a flow graph following the removal of dead code in accordance with the present invention.
Figure 7B:
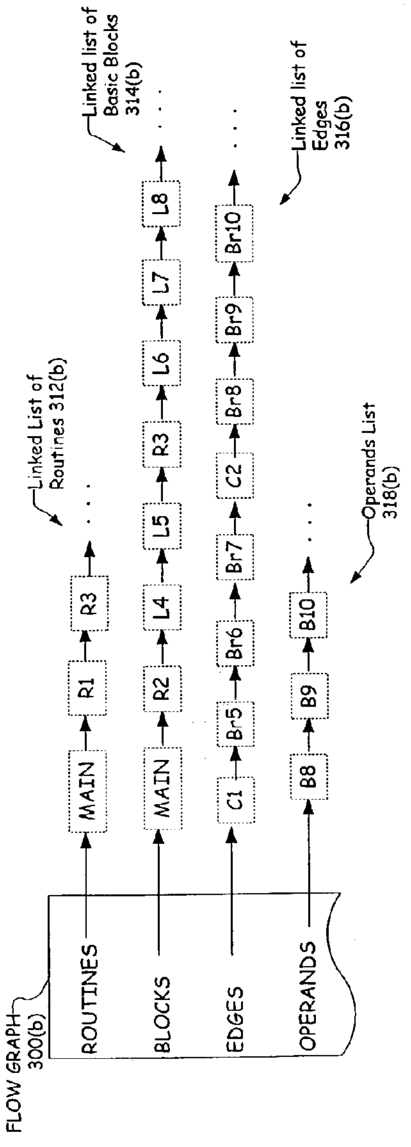

Once all necessary instructions have been marked dead, the control flow graph may be modified so that the dead instructions may be removed from execution. FIG. 7 illustrates the result of this process. FIG. 3*c* has been reproduced in FIG. 7*a* for ease in comparing flow graph 310 before and after dead code has been removed from routine R1. As seen in FIG. 7*b,* linked list of routines 312(*b*), linked list of basic blocks 314(*b*), linked list of edges 316(*b*), and linked list of operands 318(*b*) have been modified to so that the dead instructions are removed from execution. Using flow graph (e.g., flow graph 300(*b*)) post-optimizer 124 may generate post-optimized code 126 that results in executable 130.

Figure 8:
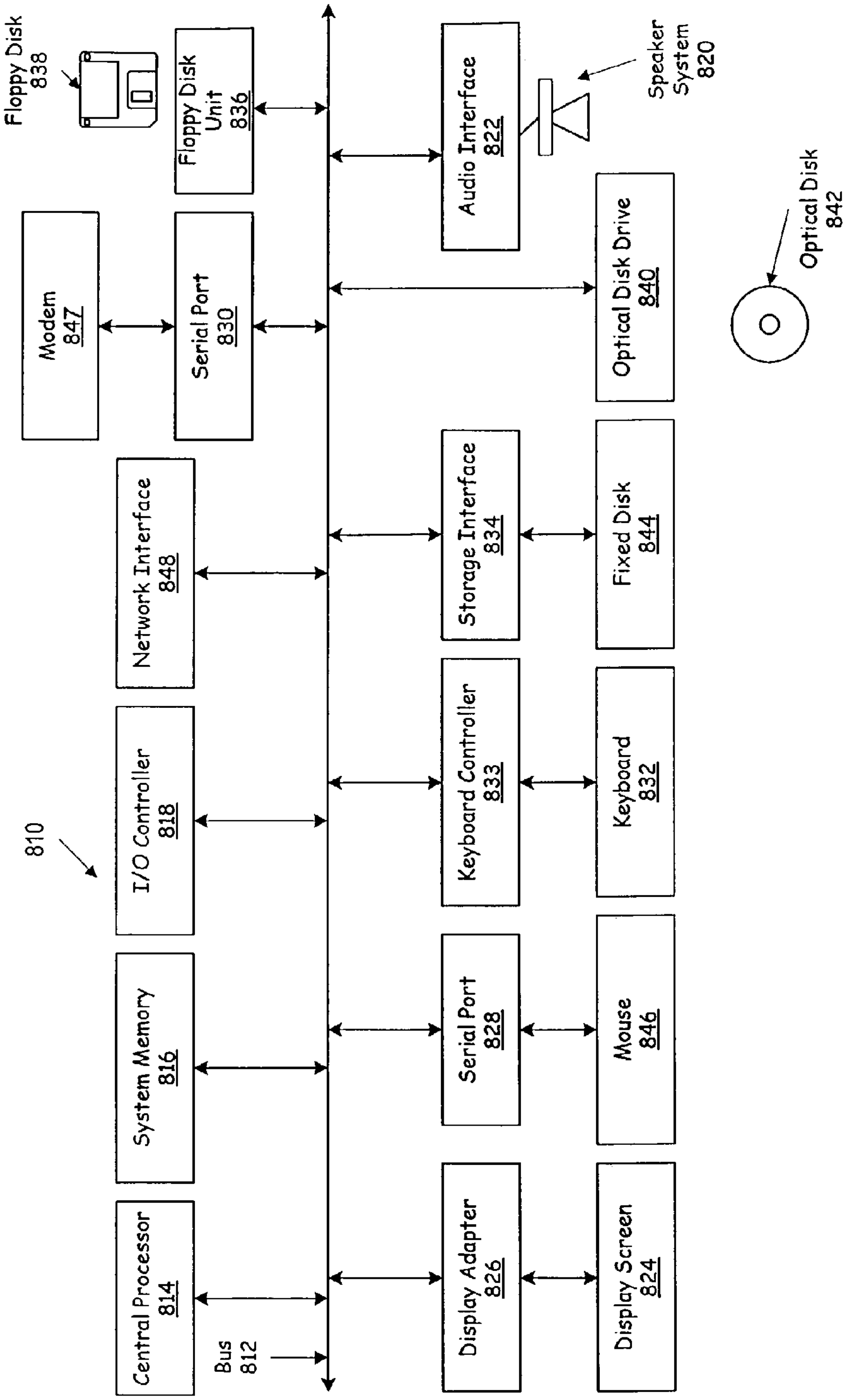
FIG. 8 is a block diagram of a computer system for implementing the techniques of the present invention.

FIG. 8 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or the like), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834, a floppy disk drive 836 operative to receive a floppy disk 838, and a CD-ROM drive 840 operative to receive a computer readable media 842 (e.g., a CD-ROM). Also included are a mouse 846 (or other point-and-click device, coupled to bus 812 via serial port 828), a modem 847 (coupled to bus 812 via serial port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) that controls basic hardware operation such as the interaction with peripheral components. Applications resident with computer system 810 are generally stored on and accessed via a computer readable medium, such as a hard disk drive (e.g., fixed disk 844), an optical drive (e.g., CD-ROM drive 840), floppy disk unit 836 or other storage medium. Additionally, applications may be in the form of electronic signals modulated in accordance with the application and data communication technology when accessed via network modem 847 or interface 848.

Storage interface 834, as with the other storage interfaces of computer system 810, may connect to a standard computer readable medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliance, X-window terminal or other such computing device. The operating system provided on computer system 810 may be Solaris®, UNIX®, Linux® or other known operating system. Computer system 810 also supports a number of Internet access tools, including, for example, an HTTP-compliant web browser having a JavaScript interpreter, such as Netscape Navigator®, Microsoft Explorer® and the like.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A computer implemented method of optimizing a program, comprising:

detecting an unused operand within an operands graph, said operands graph including a linked list of all operands defined and used within the program;

removing the instruction defining said unused operand from execution by marking said instruction as dead;

marking said operand as dead when an operand reference count of an operand within said operands graph is not decremented from an initial value; and decrementing an operand reference count of each operand from the initial value each time the operand is used by said instruction.

2. The method of claim 1, further comprising: traversing said operands graph for one or more unused operands.

3. The method of claim 2, wherein said traversing comprises: traversing a linked list of basic blocks.

4. The method of claim 3, wherein said traversing further comprises: traversing a linked list of operands.

5. The method of claim 1, wherein said removing further comprises: adjusting a control flow of the program so said instruction is not executed.

6. The method of claim 1, further comprising: repeating said marking said operand, said removing said instruction, and said decrementing said operand reference count for each operand used by said instruction.

7. The method of claim 6, further comprising: modifying a basic block comprising said instruction so said instruction is removed from execution.

8. The method of claim 6, further comprising: deleting said basic block from a control flow graph when all instructions in a basic block have been marked as dead.

9. The method of claim 8, further comprising: adjusting said control flow graph.

10. The method of claim 8, further comprising:

generating said operands graph so said instructions in said basic block are removed from execution.

11. The method of claim 10, wherein said generating comprises:

storing, in an operand memory space, a pointer to an instruction defining an operand; and storing, in said operand memory space, an operand reference count for each use of said operand.

12. The method of claim 11, further comprising:

repeating said allocating said operand memory space, said storing said pointer, and said storing said operand reference count for each operand defined in said program.

13. A computer-readable storage medium having stored thereon instructions which, when executed by a processor, configure the processor to perform a method comprising: detecting an unused operand within an operands graph, said operands graph including a linked list of all operands defined and used within the program;

removing the instruction defining said unused operand from execution; and traversing a linked list of basic blocks and said linked list of operands in said operands graph for one or more unused operands.

14. The computer-readable medium of claim 13, wherein said removing comprises: marking said instruction as dead.

15. A system having processor comprising:

an operands graph traversal module configured to traverse an operands graph generated from a computer program, said operands graph including a linked list of all operands defined and used within the program;

a dead operands detection module configured to detect an unused operand using said operands graph, detect an operand within said operands graph having a use-def count of 1, and mark said operand as dead; and a dead instruction detection module configured to remove an instruction defining said unused operand from execution and mark said instruction as dead in response to said dead operands detection module marking said operand as dead.

16. The system of claim 15 further comprising: a flow graph clean-up module configured to adjust a flow graph generated from said computer program so that said instruction is not executed.

17. A system having processor comprising:

means for detecting an unused operand within an operands graph, said operands graph including a linked list of all operands defined and used within the program; and means for removing the instruction defining said unused operand from executions, said means for removing comprising:

means for marking said instruction as dead, and means for adjusting a flow graph such that said instruction is not executed, said flow graph generated from a computer program, said operands graph generated via static single assignment from said flow graph.

18. The system of claim 17, the method further comprising: means for traversing said operands graph for one or more unused operands; and means for marking said one or more unused operands as dead.

19. The system of claim 17, wherein said removing comprises: means for marking said instruction as dead.

* * * * *